US006340078B1

(12) United States Patent
Scheible

(10) Patent No.: US 6,340,078 B1
(45) Date of Patent: Jan. 22, 2002

(54) BRAKING DEVICE WITH CLOSING SERVO CONTROL FOR MOVABLE CABINET/FURNITURE PARTS

(75) Inventor: Adolf Scheible, Lauterach (AT)

(73) Assignee: Grass GmbH, Voralberg (AT)

( * ) Notice: Subject to any disclaimer, the term of this patent is extended or adjusted under 35 U.S.C. 154(b) by 0 days.

(21) Appl. No.: 09/368,791

(22) Filed: Aug. 5, 1999

(30) Foreign Application Priority Data

Aug. 6, 1998 (DE) ........................................ 198 35 466

(51) Int. Cl.[7] ................................................ B60T 13/04

(52) U.S. Cl. .................. 188/166; 312/333; 312/334.33; 312/334.44

(58) Field of Search ................................. 188/166, 216, 188/72.1, 72.3, 73.1, 82.1; 312/334.9, 334.12, 334.1, 334.33, 334.31, 333, 334.44, 334.6, 334.15, 334.16, 334.18, 334.36

(56) References Cited

U.S. PATENT DOCUMENTS 3,508,292 A * 4/1970 Hagendoorn et al. ....... 312/333
5,302,016 A * 4/1994 Lautenschlager et al. ... 312/333
5,344,228 A * 9/1994 Kovarik et al. .......... 312/334.9
5,433,517 A * 7/1995 Fleisch .................... 312/334.8
6,113,204 A * 9/2000 Jahrling et al. ........ 312/334.31

FOREIGN PATENT DOCUMENTS

DE 3834721 * 4/1990
DE 0768050 * 4/1997

* cited by examiner

*Primary Examiner*—Pam Rodriguez
(74) *Attorney, Agent, or Firm*—Kilpatrick Stockton LLP

(57) ABSTRACT

The invention concerns a braking device with closing servo control for movable cabinet/furniture parts, such as drawers, cabinet and furniture doors, etc. The device includes a casing located on either a fixed or movable cabinet/furniture component and this casing has a pull-in device located within it, which has a mechanical energy store, and a connected movable control element is also located within the casing, and a driving pin that is always located on the other cabinet/furniture components and works together with the control element. This pull-in device that works as a closing servo control after the braking process, is shown, in that, in the casing between the energy store and the control element, there is a connected braking element that is guided and movable. The braking device, thus, forms a unit with the pull-in device and is controlled likewise by the driving pin.

13 Claims, 8 Drawing Sheets

Detail X
Detail Y
B
B
X
Y

BRAKING DEVICE WITH CLOSING SERVO CONTROL FOR MOVABLE CABINET/FURNITURE PARTS

BACKGROUND OF THE INVENTION

The invention involves a braking device with a closing servo control for movable cabinet/furniture parts such as drawers, doors, lifters, tabs and suchlike. The AT 399 809 B makes a braking device for drawers, which is known, that has a braking glide attached to the cabinet/furniture body. Two longitudinally movable brake grips in or on the braking glide are activated by a stop on the drawer, and so the braking grips are moved against it by the action of the spring. The spring counters a somewhat U-shaped braking grip carrier with pressure, so that, simultaneously, the braking grips are pressed by the respective slanted surfaces on the side of the braking glide. The drawer movement will brake by means of the force of the spring and, additionally, the force of the brake. The spring is designed as a pressure spring, which is tightened in the drawer's closed position—strongly taut against the closed position. The closing force to place the drawer back in a defined end (closed) position is not available or possible. With the self-locking braking action of the braking device, the drawer stays, after it is pushed, in a position before it completely closes. With the non self-locking braking action, the taut spring pushes the drawer back in an uncontrolled open position again. This known braking device is suitable for braking a drawer, but however, does have the disadvantage that after the drawer brakes, it stays in an arbitrary position and must be manually closed all the way. The braking force, before the closed position has been attained, is relatively large due to the braking friction and the spring's force and must be overridden manually in order for the drawer to be shut completely. When the drawer is opened again, the braking force must be overcome until the spring's pressure is released. So the braking device counteracts the closing movement.

Pull-in devices for drawers and closing devices are known. The EP 0 391 221 makes known a pull-in device for drawers, which pulls a drawer in over a longer distance. A spring-loaded tilting element located on the cabinet body side and a drawer-side fastened driving pin, acting as a feed release (trigger) pulls the drawer to a closed position. A braking device is not available. The AT 291 038 shows a cabinet/furniture door hinge, which is designed as a two-armed swinging hinge. In order to close, one of the swinging arms is designed with a radial cam on which a spring-loaded roller unrolls and generates closing pressure. Here, too, the closing motion is unrestricted so that too strong a closing motion is not intercepted and the cabinet/furniture door slams uncontrolled.

The disadvantage of the known pull-in or closing devices is the lack of braking during the closing of cabinet/furniture components. When drawers are pushed or cabinet/furniture doors are shut hard into cabinets or furniture, they reach the first position uncontrolled, causing slamming noises and then partially open again. Rubber buffers or suchlike are frequently placed at the end stop, but don't satisfactorily reduce kinetic energy and lead to undesirably high force which can damage both the cabinets/furniture and hardware fittings. A rebounding of movable cabinet/furniture components during forceful closings can certainly not be prevented with the use of rubber buffers.

SUMMARY OF THE INVENTION

The purpose of the invention is to design a braking device with a closing servo control for movable cabinet/furniture components which effects a certain deceleration over a longer braking path and finally brings the movable cabinet/furniture component to the end (closed) position and holds it there.

Another task is to attain an almost brake-free opening operation.

An additional task is to design a braking device that has a compact, cost-efficient and easy-to-assemble closing servo control that meet current demands.

Another task is to design a braking device with a closing servo controller that brakes the movable cabinet/furniture components softly and gently, and closes without any transition and without any adjustments being made.

This task is solved by the characteristics of an embodiment of the present invention.

The basis of the invention is that in the casing between the energy store and the control element, there is a connected braking element that is guided and movable.

The advantage of the invention consists of this: the energy of the movable cabinet/furniture component's mass is evenly reduced on a certain distance path and, consequently, the cabinet/furniture component is braked. The necessary deceleration force works evenly over the entire braking distance. This essentially depends on the closing speed and the mass moved. With lower mass forces, the cabinet/furniture component is on the shorter distance and will brake more quickly. With increased mass forces, the braking distance and braking time is correspondingly longer. However it adjusts automatically and adapts to the introduced outer energy resulting in a soft and gentle braking of the furniture component as long as the thrust is effective. If the braking thrust decreases towards the end, the brake releases. In this moment, the closing servo control kicks in and brings the movable cabinet/furniture component to the end position (closed) position. The closing process occurs independently from the cabinet/furniture component's position after the braking; that is, the closing servo control operates independently from the mass forces, Therefore, no adjustments, settings or tuning procedures are necessary.

Another advantage is the oil-free and pneumatic-free system. The system works as a pure friction-brake and contains no electrical operating control and setting elements. Another advantage is the brake-free opening process. As described above, the braking action releases with the drawers—that is—when beginning the closing force. The braking device only operates following a closing push. When opening, only a minimal force of the closing spring is to be overcome and prestresses it. This energy storage is known and necessary in order to make the pull-in movement possible. The stored energy in the spring is used here, however, to additionally release the braking effects.

Another essential advantage emerges from the compact design. The braking device and closing servo control are accommodated in a casing and form one unit. An actuating pin, catch or driver is provided only on one of the cabinet/furniture components in a known manner to release the device. The braking device with the closing servo control is preferably designed as a plug-in and can be attached to the fixed, but also the movable cabinet/furniture component. The actuating pin is therefore located on various other cabinet/furniture components. An actuating lever or lever system can be provided on doors.

Friction brakes, moreover, dampen the vibrations of the roller glides and provide a quiet glide.

Advantageous designs and further developments are the objects of the subordinate patent claims.

So, for example, the control element is preferably designated as a snap-in element with a driving pin so that the snap-in element has a snap-in nose, which is hanged, tightened, in the front-end side of the casing.

The braking element operates as a pure friction-brake and includes at least one braking grip, which lies on the casing's inner wall. The braking element is movable, guided in a corresponding guide track within the casing.

The braking element is hinged with the snap-in element and the energy store; the energy store, preferably, has an inserted tension spring.

In a preferred embodiment, the snap-in element has a coupling peg, which is held in a corresponding groove of the braking grip. Moreover, two arrow-shaped slanted surfaces lie on the corresponding slanted surfaces of the brake grip and when force is exerted on the slanted surfaces' snap-in element, they (two arrow-shaped slanted surfaces) slide off together and result in an expansion of this braking grip's component.

According to the first embodiment, the braking device includes two distancing braking grips that are located opposite each other and have at least one roller placed between them, which rolls when force is activated on the braking grip in its lengthwise direction on the braking grip's corresponding slanted surfaces and effects a change in the braking grip's distance. The slanted surfaces can essentially be designed flat or even, but can also be designed as a radius surface with a fixed or adjustable radius. Therefore, for example, a progressive control of the braking force is possible. In order to reach a certain minimum triggering level of the braking device, the slanted surfaces could have an elevation, which must first be overcome with the release of the brake by the roller. In this embodiment the tension spring is fastened between the casing's back wall and the roller. The braking grips have noses to position against the rollers, which hold the braking grips in a defined starting (exit) position.

In a second embodiment, the braking element includes several inter-movable, however, interconnected braking grips. At least one of the braking grips has a cambered gliding surface on which at least one other braking grip glides along on the corresponding gliding surface, and with force activated in the direction of the longitudinal axis of the braking element, a change in the braking element's cross section is effected.

One of the braking grips is connected resiliently to the tension spring. The force activated by the tension spring on the braking grips jams it inside the casing's guide track and softly brakes during the pull-in device's operation.

In another embodiment the braking element includes one (first) braking grip and another (second) braking grip. The second braking grip is designed as one-piece, elastic, ductile part that changes its cross section according to the force activated in the longitudinal axis' direction.

The invention at hand will be explained in the following more precisely by various embodiments shown by representational drawings. Hereby, additional significant features and advantages of the invention will be concluded from the drawings and their descriptions.

DETAILED DESCRIPTION OF THE INVENTION

Figure 2:
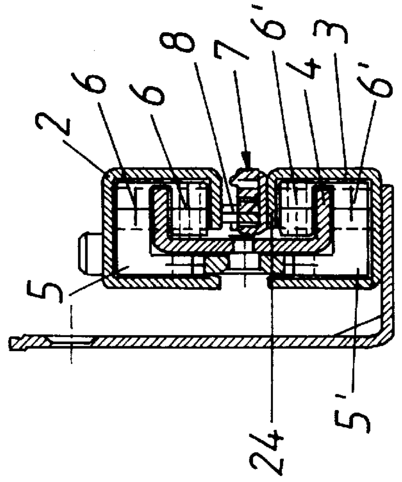
FIG. 2: shows a cross section through the system, according to FIG. 1 along the Line A—A.
Figure 1:
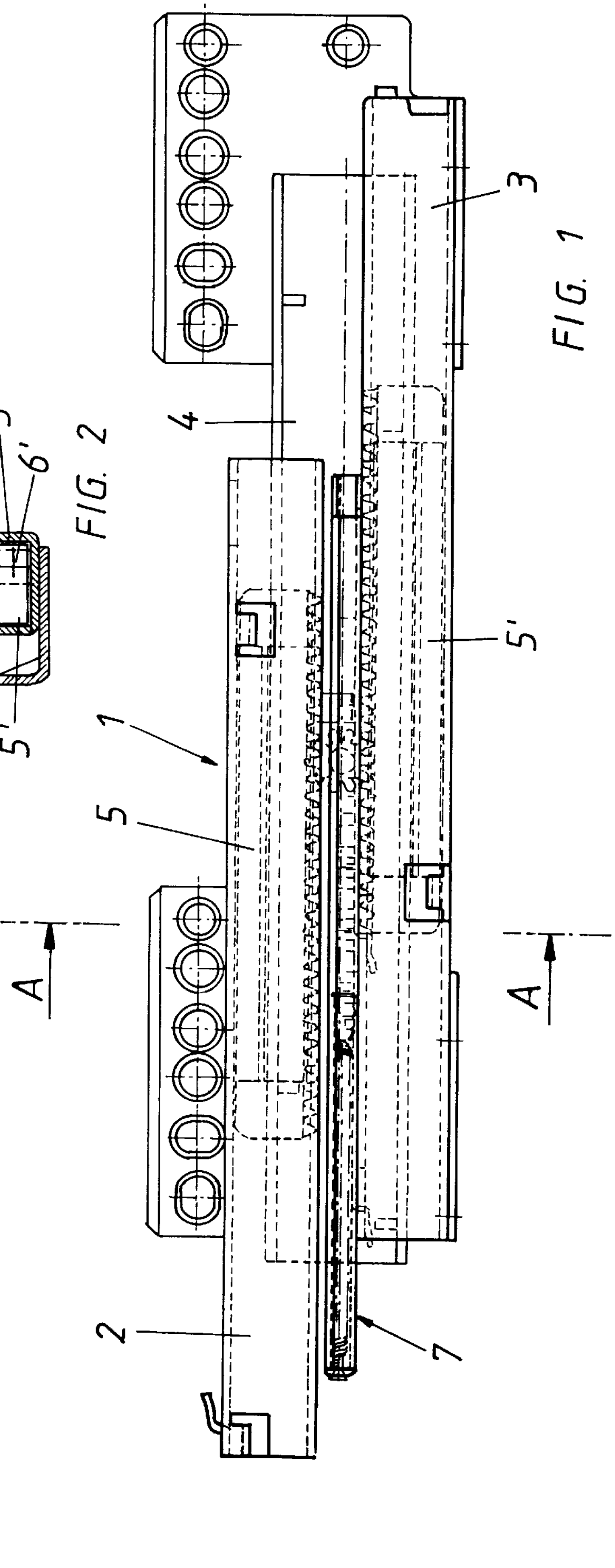
FIG. 1: shows the possible braking device system with the closing servo control, as an example, on the drawer slide.

FIGS. 1 and 2 show a possible layout of the braking device with a closing servo control as an example of a drawer slide. A pull-out slide (1) for a drawer with a first insertion-side slide rail (2), a second cabinet-body-side slide rail (3) and between these slide rails, a center rail (4) is located. In a known way, both pull-out slides (2,3) have cages (5,5') with corresponding roller bearing systems (6,6'), which roll load transferring between those corresponding rolling surfaces of the center rail (4). The braking device with the closing servo control is fastened, for example, on the cabinet-body-side slide rail (3) between both the slide rails (2,3), so that one of the attached driving pins (8) on the drawer rail (2) can engage in the braking device with a closing servo control (7) in order to activate the combined effects of the braking device's control component (11) with the closing servo control when closing the drawer. Then, however, when the drawer is opened the control component (11), that is the snap-in element (11) is entrained by the driving pin (8) so that one of the snap-in noses on the snap-in component (11) engages in the device on the casing (13) in a holding position that is, for example, represented in FIG. 3. Simultaneously, a mechanical energy store, that is preferably designed as a tension spring (9) is tightened. This function is only for a pull-in device consisting of a casing (13) with a guide track (12), one movable snap-in element (11) in the guide track (12), an inserted tension spring (9) between the casing end wall (14) and the snap-in element (11) is known as an energy store.

Figure 3:
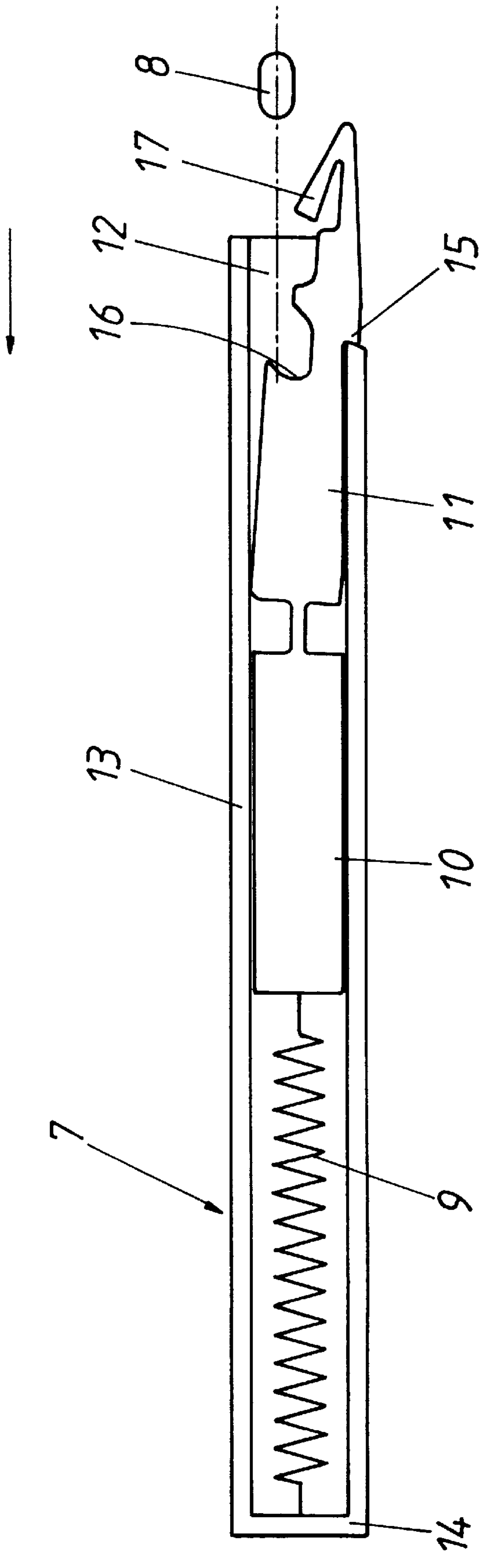
FIG. 3: shows a side view of the essential components of the braking system with closing servo control.

As represented in FIG. 3, a braking element (10) movable in the same guide track (12) is inserted between the snap-in element (11) and the tension spring (9). The snap-in element (11) and the braking element (10) are coupled together movable. The tension spring (9), as an energy store for the closing movement, is hanged jointed on the other end of the braking element (10).

Figures 4, 5, 6, 7, 8A, 8B, 8C, 8D:
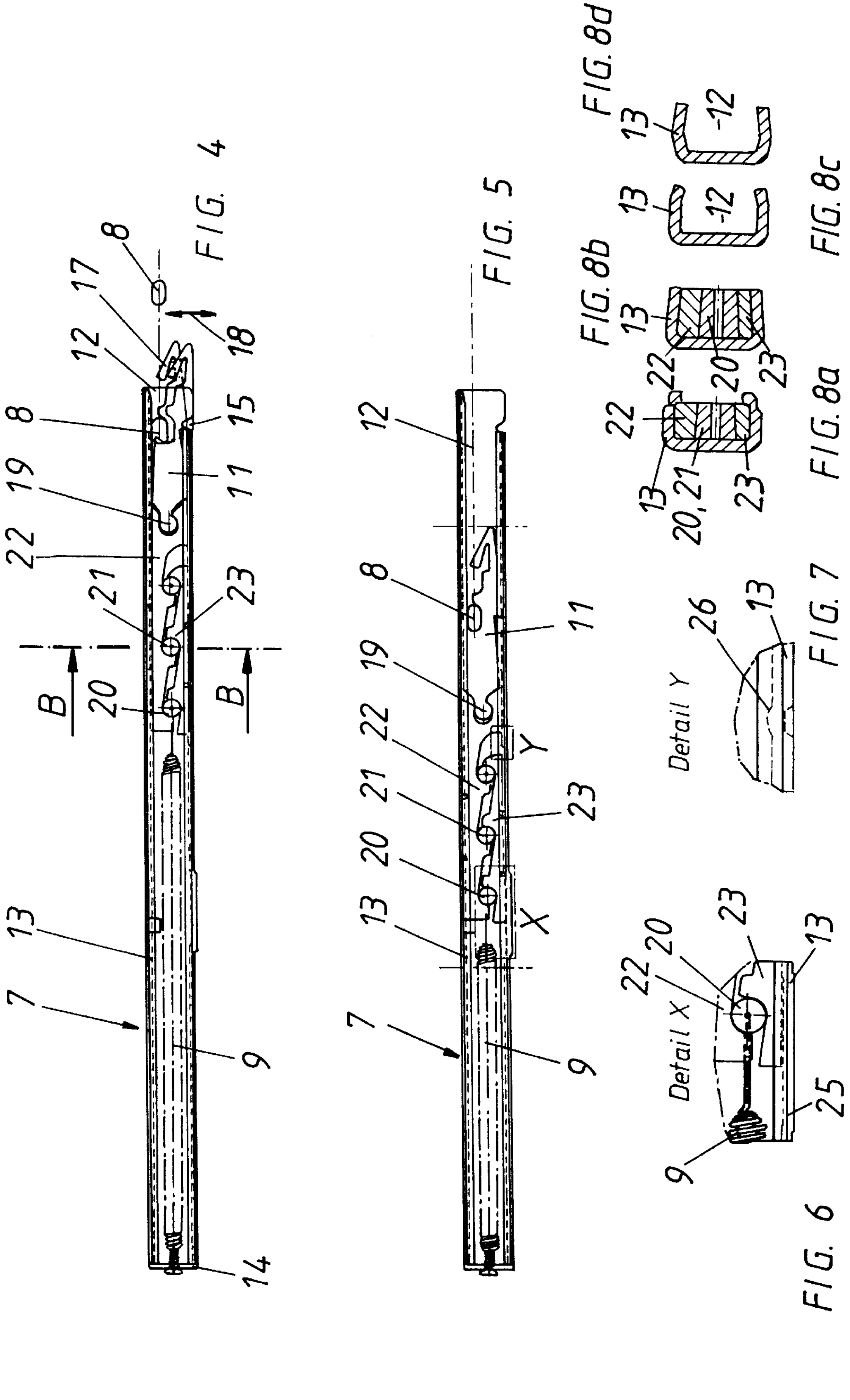
FIG. 4: shows a side view of the first embodiment of the braking device with closing servo control in an open drawer.
FIG. 5: shows the view of FIG. 4 in a retarded drawer.
FIG. 6: shows Detail X from FIG. 5.
FIG. 7: shows Detail Y from FIG. 5.
FIGS. 8*a*–8*d*: shows various cross-sections of the braking device with closing servo control along Line B—B in FIG. 4.
Figure 9:
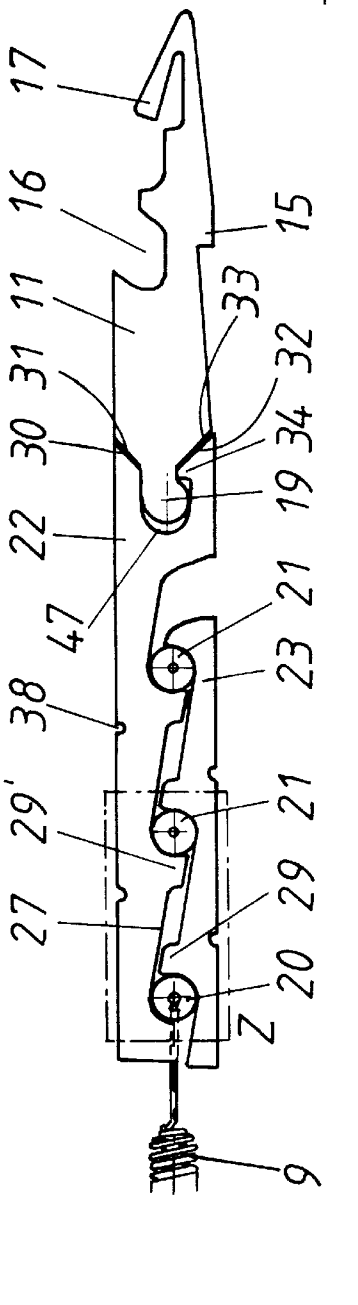
FIG. 9: shows a side view of the snap-in element with the braking elements coupled in the pull-in (entry) position.

When the drawer is opened, the snap-in element (11) with its snap-in nose (15) is hanged on the front end of the casing and the braking device with the closing servo control is in the "exit" position, as represented in FIGS. 4 and 9. On the opposite side of the catch nose (17) on the snap-in element (11), a coupling peg (19) with 2 arrow-shaped slanted surfaces (31,33) is formed. On this coupling peg (19) there is an upper braking grip (22) form-fitted by means of a corresponding groove (47). One of the driver noses (34) located on one of the upper braking grips (22) engages in a fitting groove (35) of the snap-in elements (11) and guarantees that the braking element (10) is caught in the drawer's opening position and in the pull-out (closing) position of the tension spring (9) while the corresponding upper braking grip's (22) slanted surfaces (30,32) lie on the snap-in element's (11) slanted surfaces (31,33). There is a lower braking grip (23) located distanced from the upper braking grip (22) so that at least one roller (20,21) is located between the braking grips which, when force is activated on the braking grips (22,23), rolls in its lengthwise direction on the corresponding slanted surfaces (27,28) and, thus, activates a change of the braking grips' (22,23) distances. In a first embodiment, the braking element consists of the braking element which has 2 braking grips (22,23) with rollers (20,21) between them. The braking grips (22,23) are sized in their lengthwise extension so that at least one, but preferably more, rollers can be retained.

The tension spring (9) is, thus, pulled out to its maximum length between the casing back wall (14) and the first roller (20) as an energy store, as is shown in FIG. 4. The drawer is open. The taut spring (9) exerts a certain traction on the roller (20) and pulls it a small distance of about one-tenth of a millimeter back (see FIG. 11). This causes a certain basic friction by a minimal expansion of the braking grips (22, 23) through the roller (20) unrolling on the slanted surfaces (27,28). After this small axial movement, the roller (20) lies with its outside diameter on the upper braking grip (22) so there is not stronger expansion of the braking grips and this increases the friction. This basic friction regulates the desired pull-in speed according to the braking operation of the push-in drawer and this resistance secures the perfect start of the braking operation. The perfect braking start is guaranteed by a starter nose (26) that counters the upper braking grip (22) with the drawer's pull-in motion with sudden resistance. Compare to FIG. 7.

Figure 10:
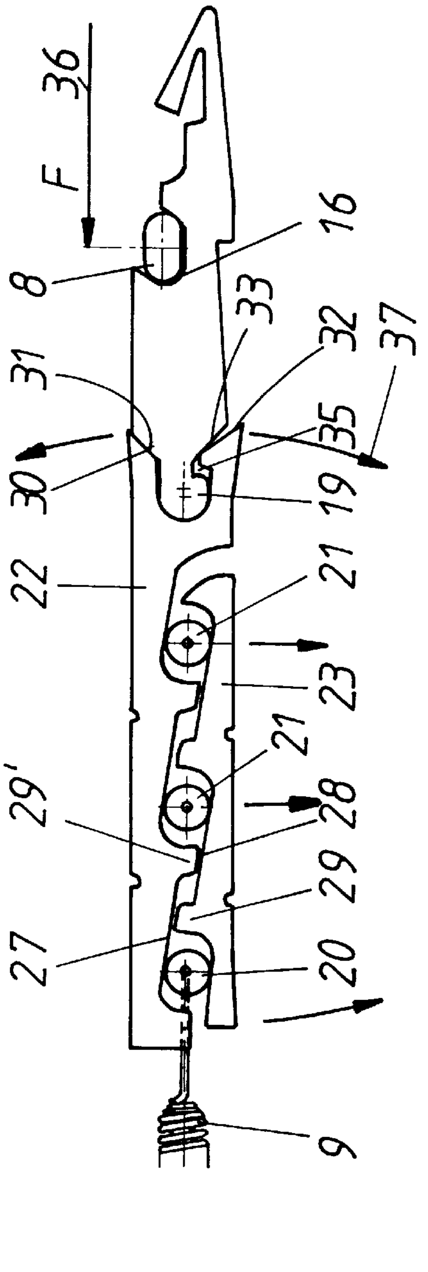
FIG. 10: shows a view of FIG. 9, but in the "brake" position.
Figure 14:
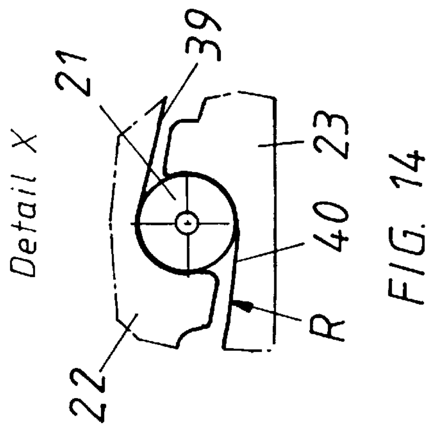
FIG. 14: shows Detail X from FIG. 13.

If the drawer is now pushed in, the driving pin (8) releases the snap-in element (11) out of its catch position, as is represented in FIGS. 5 and 10. The driving pin (8) goes over the catch nose (17) of the snap-in element (11) in its notch (16) and disengages the snap-in element (11) by the snap-in nose (15) with the casing (13). The unhinged snap-in element (11) is pushed against the upper braking grip (22). Then the slanted slopes (30,32) of the upper braking grip (22) are pushed apart by the corresponding slanted surfaces (31,33) of the snap-in elements (11), already resulting in the start of the braking action. Simultaneously, the upper braking grip (22) is moved in the arrow direction (36). The rollers (20,21) roll off the slanted surfaces (27,28), moving the braking grips (22,23) against each other and expanding against each other. This expansion of the braking grips occurs more forcefully; the faster the drawer's push-in speed is and the larger the push-in mass is. Once the drawer's braking has occurred, the pulling action of the tension spring (9) takes place, which pulls the upper braking grip (22) over the roller (20) in the push-in direction (36). The braking grips (22,23) reach in their normal position, as illustrated in FIG. 9 and the braking is reduced so that the drawer is pulled by the tension spring (9) into its closed position. Then the braking and closing process are completed.

As shown in FIG. 6, a release (25) in the casing (13) in the tension spring's (9) pull-in area can make the spring's pull easier by the guide track's (12) widening in the release (25) area of the braking element (10), which counters a reduced resistance. The generated braking force is released by the rollers (20) and the pull-in device can operate unhindered.

Figure 11:
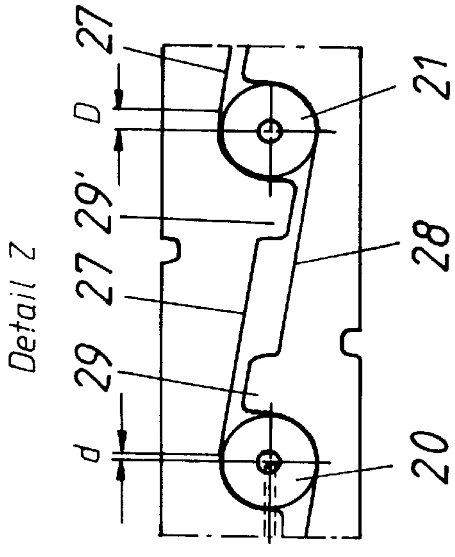
FIG. 11: shows a section of the braking element according to Detail Z from FIG. 9.

As FIG. 11 shows, the distance "d" between the center of the first roller (20) and the start of the slanted surface (27) is essentially less than the distance "D" between the center of the following roller (21) and the beginning of the following slanted surface (27). This is designed so that the roller reaches the operating area of the slanted surfaces (27) earlier than the roller (21), so that at the beginning of the braking process, the roller (20) activates the braking before the next roller (21), thereby generating an additional braking action.

The guide track (12) in the casing (13) is designed preferably C-shaped so that the braking element (10) and the snap-in element (11) are guided securely into the sliding seat. The casing (13) consists preferably of rustproof steel, which is designed by the corresponding profiling of the guide track (12). In the FIGS. 8*a* to 8*d*, examples of various casing (13) profiles are shown Conical guide tracks, as shown in FIGS. 8*b* through 8*d*, are shown that have larger guide and working surfaces for the braking grips (22,23). The rollers (20,21) should preferably have their lines of contact enlarged and should be designed spherical, crowned or conical to prevent them from falling out. A small compact and, therefore, useful design is achieved with this profiled, rail-type casing (13) and can be fastened with easy and simple methods to the respective movable or fixed slide rails of the drawer's pull-out (1).

Figure 12:
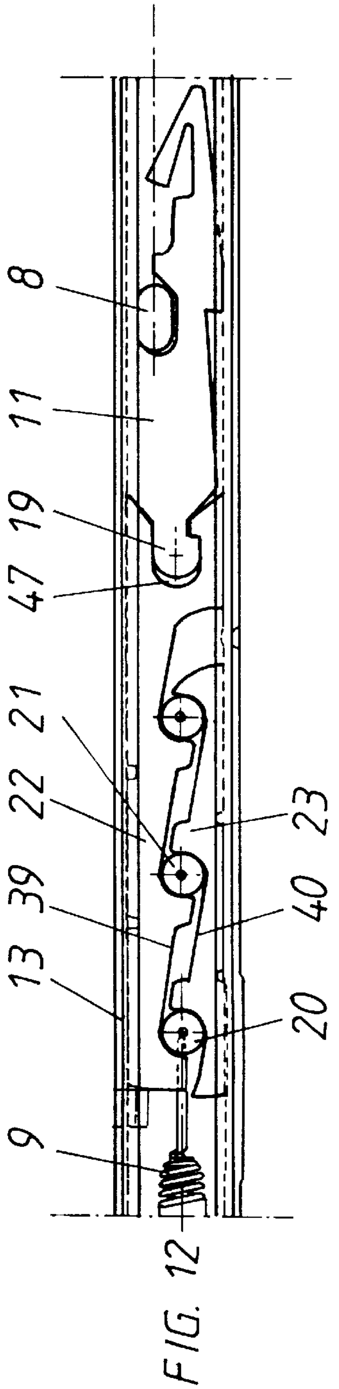
FIG. 12: shows a side view of another embodiment of the braking device with a closing servo control in the pull-in (entry) position.
Figure 13:
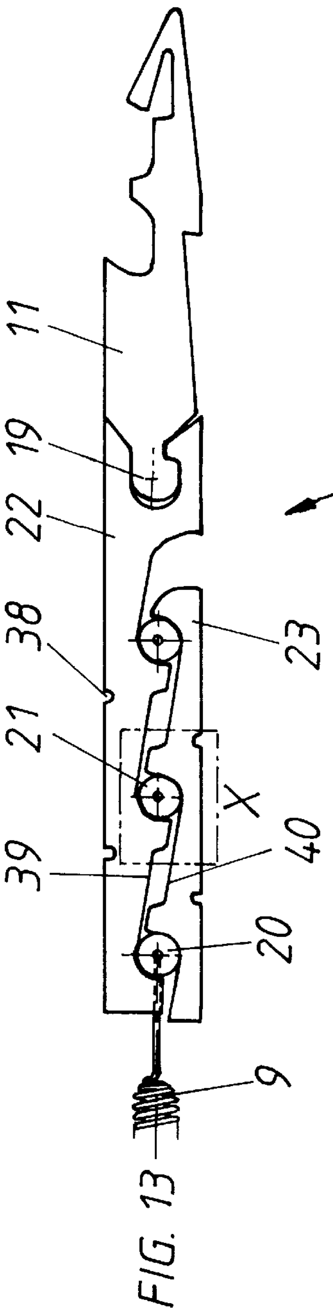
FIG. 13: shows a side view of the snap-in element coupled with the braking elements and in the pull-in (entry) position.
Figure 15:
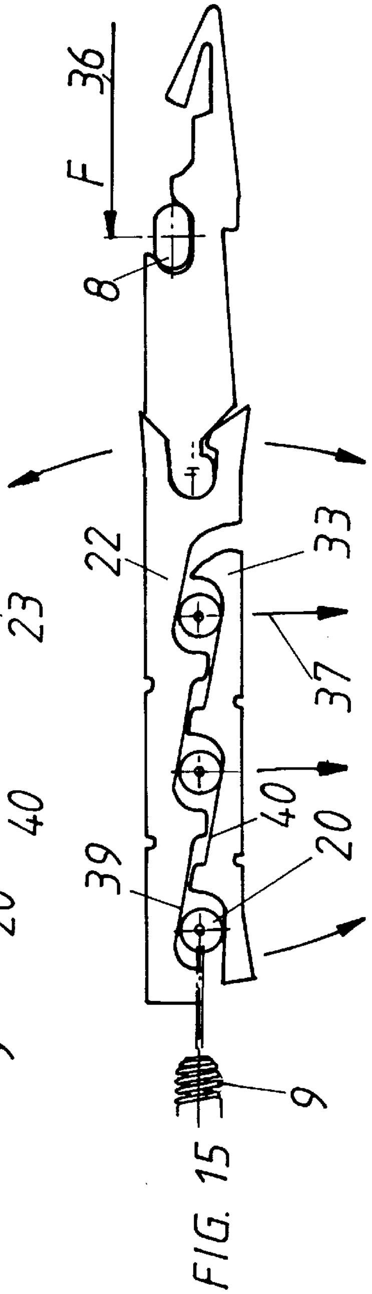
FIG. 15: shows a side view of the snap-in elements coupled with the braking elements in the "brake" position.
Figures 16, 17, 18, 19:
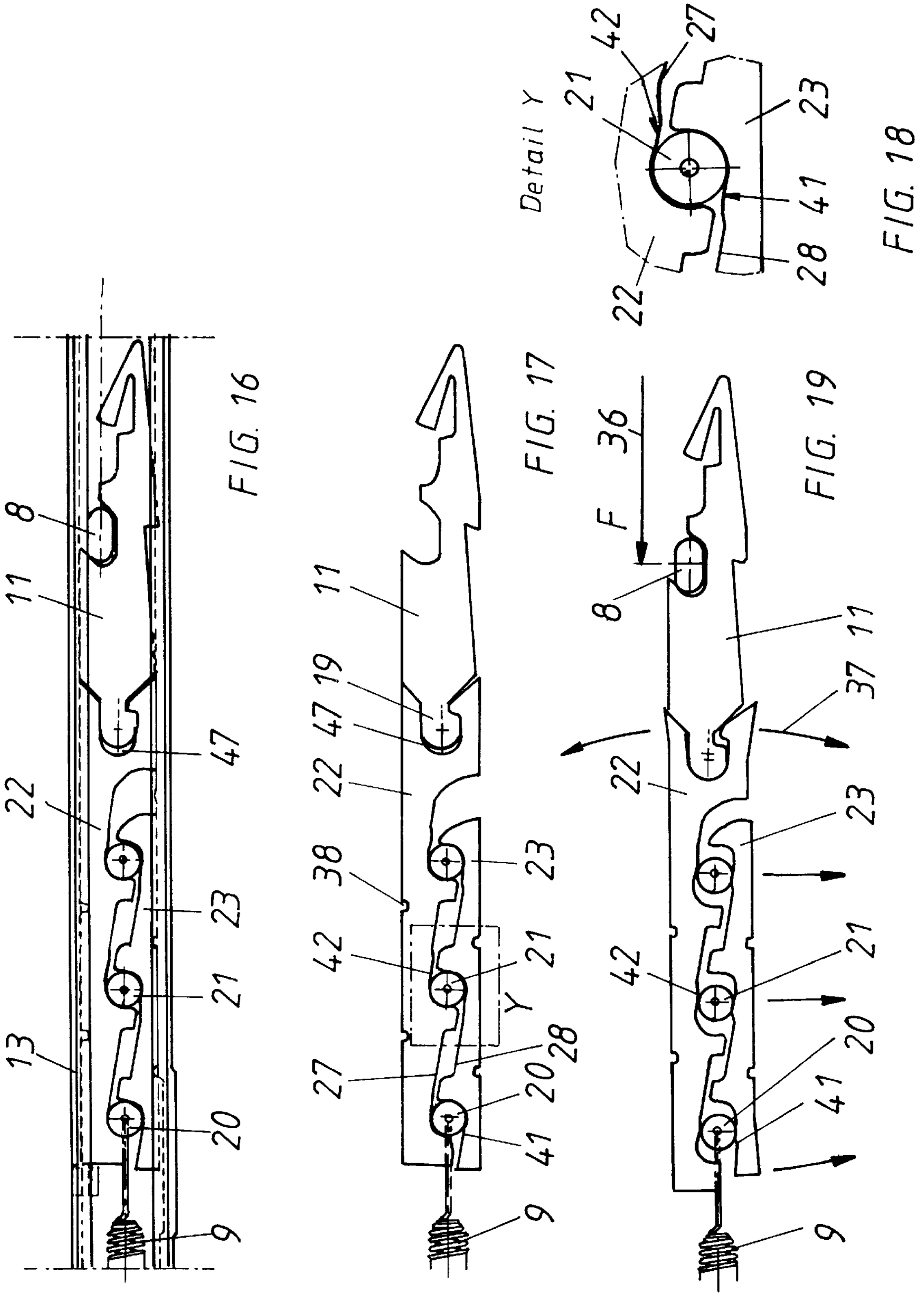
FIG. 16: shows a side view of other embodiments of the braking device with closing servo control in the pull-in (entry) position.
FIG. 17: shows a side view of the snap-in element coupled with the braking elements and in the pull-in (entry) position.
FIG. 18: shows Detail Y from FIG. 17.
FIG. 19: shows a side view of the snap-in element coupled with the braking elements in the "brake" position.

Another embodiment of the braking device with closing servo control is represented in the FIGS. 12 though 15. Essentially the design of the device corresponds to the described implementations according to FIGS. 4 through 11; however, the slanted surfaces on the braking grips (22,23) are not flat or straight, but are designed crooked or bent. Radius surfaces (39,40) are provided which have either a fixed or an adjustable radius. The advantage of this embodiment is that a progressive control of the braking action can be achieved by the corresponding design of Radius "R" of the slanted surfaces (39,40). Another embodiment is shown in FIGS. 16 though 19.

Here, the slanted surfaces (27,28) on the braking grips (22,23) are designed basically straight; however, have elevations (41) in the "quiet" position area of the rollers (20,21), which then give the rollers (20,21) a defined resistance to counter. The layout of the elevation (41) is especially obvious in FIG. 18. This elevation causes the braking element's (10) braking action to first be started when the drawer is closed with a certain force or with a certain speed, which must be so much that the roller that is countered here by the elevation (41), must be overcome and then first rolls off the slanted surfaces (27,28) so that the braking grips' (22,23) correspondingly distance themselves from one another and generate the braking action.

Figures 20, 21, 22:
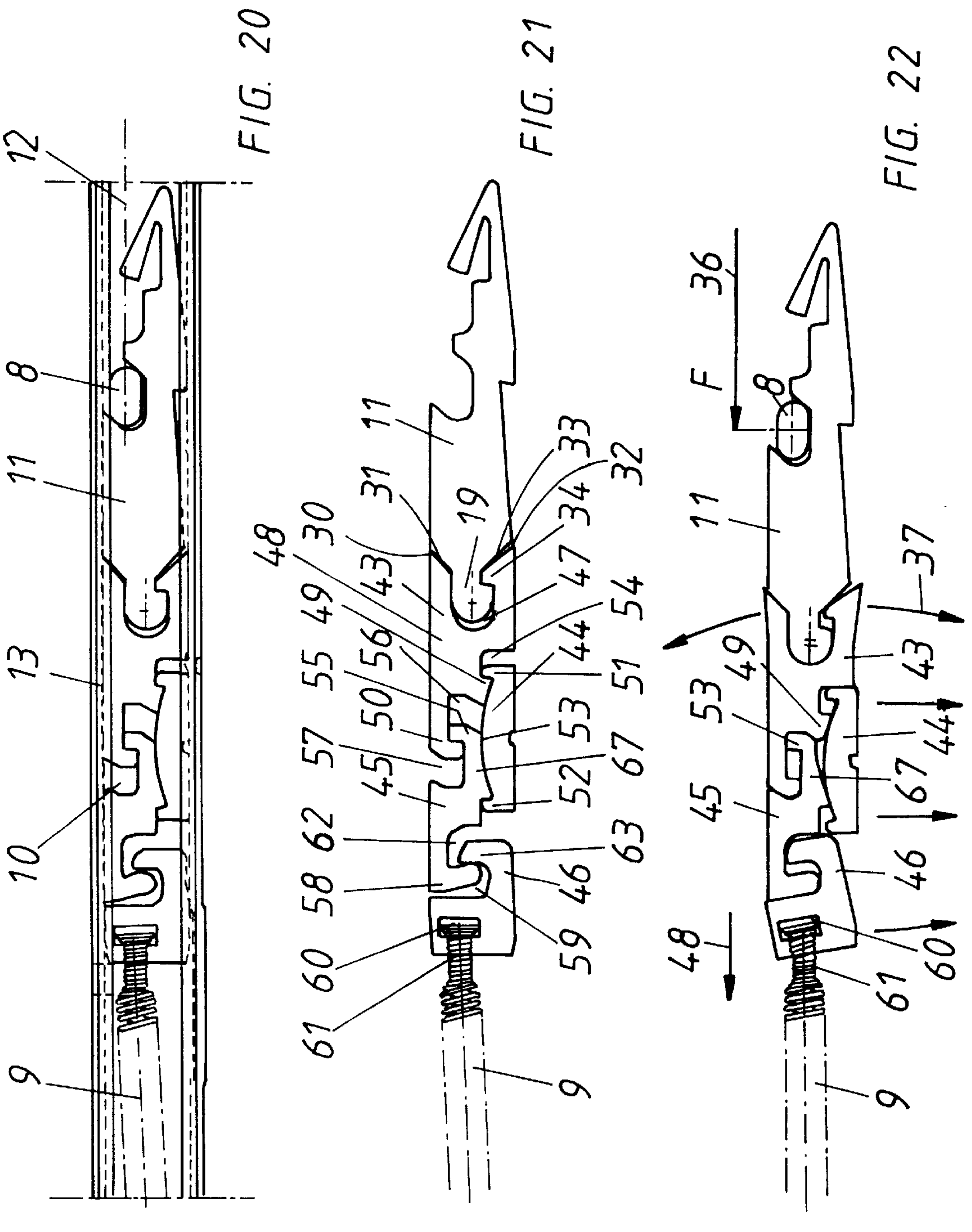
FIG. 20: shows a side view of another embodiment of the braking device with the closing servo control in the pull-in (entry) position.
FIG. 21: shows a side view of the snap-in elements coupled with the braking elements and in the pull-in (entry) position.
FIG. 22: shows a side view of the snap-in element coupled with the braking elements in the "brake" position.

According to the embodiment in FIGS. 20 to 22, the braking element (10) consists of several inter-movable, but interconnected braking grips (43 to 46). The snap-in element (11) engages in a known manner with its coupling peg (19) in a corresponding groove (47) of the first braking grip (43); whereby, the braking grip (43), that is the snap-in element (11), forms the above-described slanted surfaces (30 to 33) that can be achieved by the corresponding braking action. The braking grips (43 and 45), which are movable, are connected together in the lengthwise direction by the respective noses (50,55) and the corresponding grooves (56,57). Another braking grip (44) is located under the braking grips (43 and 45) and has a cambered gliding surface (53) that the braking grips (43 and 45) glide along on the respective guide shoes (49 and 67). Corresponding noses (51 and 52) on the braking grip (44) prevent the guide shoes (49,67) from disengaging with the gliding surfaces and secure the connection between the braking grips (43,45). If force is exerted on the snap-in element (11) in the arrow direction (36), the braking grips (43 to 45) move together so that the guide shoes (49,67) glide along the gliding surface (53). The braking grips (43 to 45) slide with the "bomb-shaped" cambered design of the gliding surface (53), not always in a lengthwise direction, but also in a crosswise direction; that is the entire braking element (10) expands and activates a braking within the casing (13).

The braking grip (45) is held by means of a bent or crooked shank (58) in a groove (59) of another braking grip (46) so that the braking grip, likewise, has a bent or crooked shank, which engages in a corresponding groove (62) of the braking grip (45). The tension spring (9) has a flexible spring end (61), which is held in a groove (60) of the braking grip (46). After the braking process (that is, when the drawer stands almost still), the spring action of the tension spring (9) begins in a known manner to generate the final closing position. Because the groove (60) is located off-center in the braking grip (46), the braking grip (46), during the pull, lightly jams by the spring and thereby effects a gentle braking action so that the drawer is pulled evenly and completely to a closing position.

Figure 23:
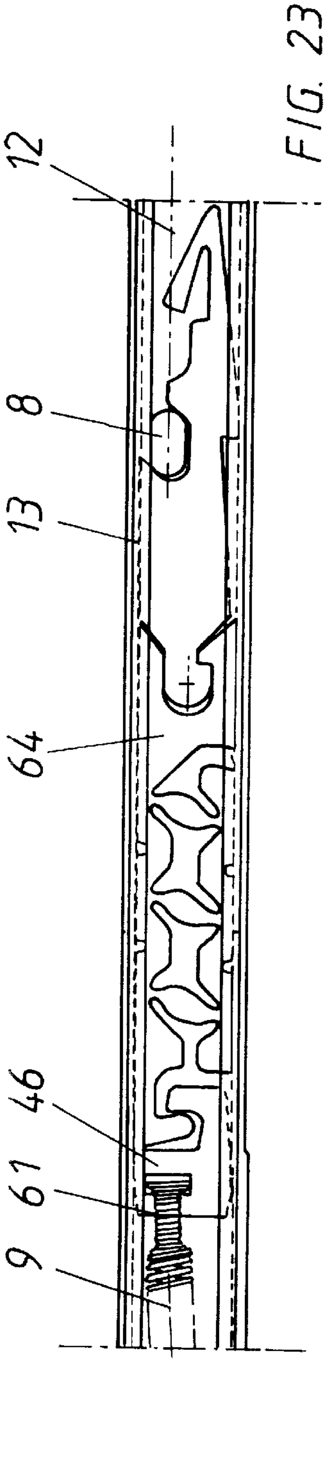
FIG. 23: shows a side view of a fifth embodiment of the braking device with the closing servo control in the pull-in (entry) position.
Figure 24:
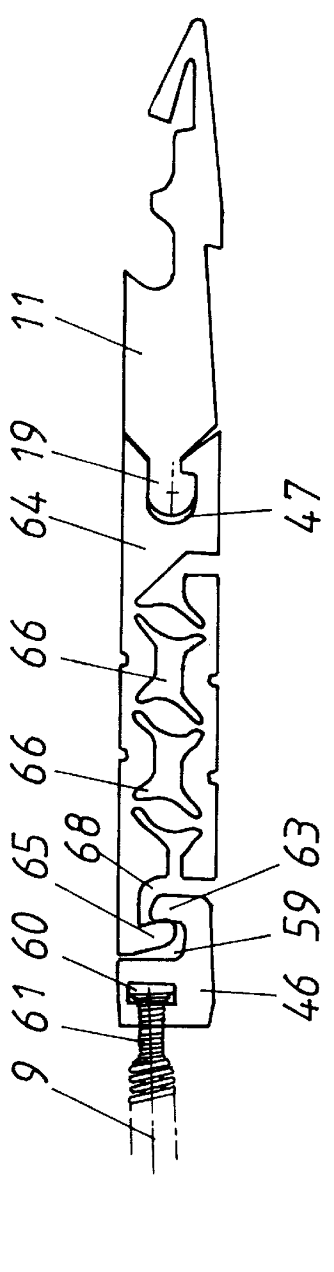
FIG. 24: shows a side view of the snap-in element coupled with the braking elements and in the pull-in (entry) position.
Figure 25:
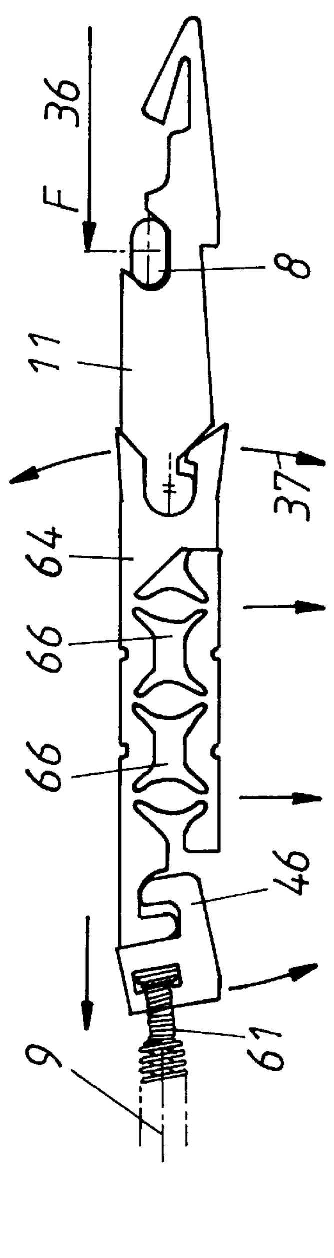
FIG. 25: shows a side view of the snap-in elements coupled with the braking elements in the "brake" position.

Finally, a last embodiment of a braking element (10) is shown in FIGS. 23 through 25. The snap-in element (11), the braking grip (46) and the tension spring's (9) fastening are all included in the design, and are described in context with the FIGS. 20 to 22. Another braking grip (64) is provided that consists of a one-piece, elastic, formable part. This part has on its front end, on the one hand, a corresponding groove (47) to take up the snap-in element's (11) coupling peg (19). On the back end the part (64) has a bent shank (65) which engages in a corresponding groove (59) of the braking grip (46) in that again, the braking grip (46) engages with a bent shank (63) in a corresponding groove (68) of the braking grip (64). Because of the snap-in element's (11) pressure from the previously mentioned expansion in the coupling peg area and the braking action due to the jamming of the braking grip (46) (previously mentioned), the pulling action of the spring (9) has already been described above. The braking grip (64) consists of an elastic, resilient formable part that has corresponding free space (66) and is designed so that with a pull on this braking grip, the braking grip's cross-section decreases and when force is exerted in the arrow direction (36), the cross-section in the arrow direction (37) increases. Depending on the size of the length of the push-in direction's exerted pressure, the braking grip (64) also expands and effects a respective braking friction on the guide track (12) in the casing (13). The advantage of this system is that the braking element (10) is designed very simply and consists of two parts (64 and 46), which results in lower assembly costs.

What is claimed is:

1. Braking device with closing servo control for movable cabinet or furniture parts, comprising one of a fixed and a movable cabinet or furniture part in an arranged casing in which a pull-in device is located that has a mechanical energy store and includes a connected guide control element, which is movable in the casing, and a driving pin that is always fastened to another cabinet or furniture part and works together with the control element; a connected braking element that is guided and movable in the casing between the energy store and the control element; and the braking element having a plurality of braking grips that lie at least partially on an inner wall of the casing.

2. Braking device with closing servo control, according to claim 1, the control element further comprising an activated snap-in element which engages the driving pin.

3. Braking device with closing servo control, according to claim 1, further comprising a snap-in element that has a snap-in nose, which hangs tightened in a layout on a front side of the casing.

4. Braking device with closing servo control, according to claim 1, wherein the braking element is formed as a friction brake with at least one of the plurality of braking grips.

5. Braking device with closing servo control, according to claim 1, wherein the braking element is guided movably in a corresponding guide track within the casing.

6. Braking device with closing servo control, according to claim 1, wherein the braking element is connected to be linked with the control component and the energy store.

7. Braking device with closing servo control, according to claim 1, wherein the energy store is a tension spring.

8. Braking device with closing servo control for movable cabinet or furniture parts, comprising one of a fixed and a movable cabinet or furniture part in an arranged casing in which a pull-in device is located that has a mechanical energy store and includes a connected guide control element, which is movable in the casing, and a driving pin that is always fastened to another cabinet or furniture part and works together with the control element; a connected braking element that is guided and movable in the casing between the energy store and the control element; and a plurality of braking grips that lie at least partially on an inner wall of the casing, the control element having a coupling peg that is held linked or jointed in a respective groove of the braking grips.

9. Braking device with closing servo control for movable cabinet or furniture parts, comprising one of a fixed and a movable cabinet or furniture part in an arranged casing in which a pull-in device is located that has a mechanical energy store and includes a connected guide control element, which is movable in the casing, and a driving pin that is always fastened to another cabinet or furniture part and works together with the control element; a connected braking element that is guided and movable in the casing between the energy store and the control element; and a plurality of braking grips that lie at least partially on an inner wall of the casing, the control element having two arrow-shaped slanted surfaces lie on respective slanted surfaces of the braking grips, so that when force is activated on the control element, the slanted surfaces glide together and effect an expansion of the braking grips.

10. Braking device with closing servo control for movable cabinet or furniture parts, comprising one of a fixed and movable cabinet or furniture part in an arranged casing in which a pull-in device is located that has a mechanical energy store and includes a connected guide control element, which is movable in the casing, and a driving pin that is always fastened to another cabinet or furniture part and works together with the control element; a connected braking element that is guided and movable in the casing between the energy store and the control element; and a plurality of braking grips that lie at least partially on an inner wall of the casing, the braking element consisting of two of the braking grips that lie distanced opposite from each other, between which at least one roller is placed that, when force is activated on the two braking grips, rolls in a lengthwise direction on corresponding slanted surfaces of the braking grips and effects a change in opposing distances of the braking grips.

11. Braking device with closing servo control, according to claim 10, wherein the slanted surfaces are basically formed flat and level.

12. Braking device with closing servo control for movable cabinet or furniture parts, comprising one of a fixed and a movable cabinet or furniture part in an arranged casing in which a pull-in device is located that has a mechanical energy store and includes a connected guide control element, which is movable in the casing, and a driving pin that is always fastened to another cabinet or furniture part and works together with the control element; a connected braking element that is guided and movable in the casing between the energy store and the control element; and a plurality of braking grips that lie at least partially on an inner wall of the casing, the energy store further comprising a tension spring that is fastened between a back wall of the casing and a roller of the braking element.

13. Braking device with closing servo control for movable cabinet or furniture parts, comprising one of a fixed and a movable cabinet or furniture part in an arranged casing in which a pull-in device is located that has a mechanical energy store and includes a connected guide control element, which is movable in the casing, and a driving pin that is always fastened to another cabinet or furniture part and works together with the control element; a connected braking element that is guided and movable in the casing between the energy store and the control element; and a plurality of braking grips that lie at least partially on an inner wall of the casing, the braking grips further comprising noses to position against rollers of the braking element.

* * * * *